United States Patent [19]

Higuchi

[11] 4,328,457
[45] May 4, 1982

[54] FULL CHARGE DETECTION CIRCUIT FOR A BATTERY

[75] Inventor: Yoshio Higuchi, Shijonawate, Japan
[73] Assignee: Daito Sound Co., Ltd., Daitoh, Japan
[21] Appl. No.: 147,821
[22] Filed: May 8, 1980
[51] Int. Cl.³ ............................................... H02J 7/04
[52] U.S. Cl. ........................................ 320/36; 320/35
[58] Field of Search ....................... 320/35, 36, 48, 57, 320/59

[56] References Cited
U.S. PATENT DOCUMENTS

| | | | |
|---|---|---|---|
| 2,529,038 | 11/1950 | Medlar et al. | 320/36 |
| 3,534,241 | 10/1970 | Wilson et al. | 320/35 X |
| 3,895,283 | 7/1975 | Peterson | 320/36 X |
| 3,928,792 | 12/1975 | Mullersman et al. | 320/35 |

Primary Examiner—Reinhard J. Eisenzopf
Attorney, Agent, or Firm—Fisher, Christen & Sabol

[57] ABSTRACT

A circuit for detecting the completion of the charging of a battery from a source of direct current employs two reference voltages, one of which is established by charging a capacitor when the charging of the battery begins, the other reference voltage is maintained by a thermistor connected across the direct current supply and in heat-exchange relationship to the battery. The first voltage is maintained by a diode which isolates the capacitor from discharging, but the other voltage drops when the fully charged battery lowers the resistance of the thermistor. The reference voltages are fed to the inputs of a difference amplifier whose output controls a switch circuit to disconnect the battery from the power source.

10 Claims, 2 Drawing Figures

FULL CHARGE DETECTION CIRCUIT FOR A BATTERY

BACKGROUND OF THE INVENTION

The device of this invention relates to a full charge detection circuit for a battery changing circuit which detects electrically the temperature rise occurring at the time of full charge of the battery by means of a temperature detection element and activates an alarm when the charge is complete or cuts off the power source.

Detection of the full charge of a battery has conventionally been made by the following methods.

(1) A method which detects a voltage drop across terminals of the battery at the time of full charge;

(2) A method which turns off charging by setting a charging time in advance;

(3) A method which detects the temperature rise value of the battery at the time of full charge; and (4) A method which sets in advance a maximum value of the voltage rise because the terminal voltage of the battery rises at the time of full charge, and detects the maximum value so set.

The applicant is also aware of the battery charging systems disclosed in the following U.S. Pat. Nos.: 3,895,283; 3,667,026; 3,579,075; 3,518,524; 2,967,988; 2,529,038; 2,402,695; 2,369,826; 976,750 and 976,747.

However, none of these methods are entirely satisfactory for the accurate detection of the full charge time because setting of the temperature or the voltage at the time of full charge fluctuates depending upon the change in the ambient temperature or in the discharge quantity of the battery and pre-setting of the charging time can not be made so accurately. In view of these problems, the device of the present invention enables the accurate detection of the full charge time by detecting the temperature difference arising from the temperature rise at the time of full charge.

SUMMARY OF THE INVENTION

The device of this invention comprises a temperature detection element to be added to a battery for detecting the temperature change of the battery; a first diode having its anode connected to the power source side and its cathode connected to the temperature detection element; a second diode having its anode connected to the cathode of the first diode and to the temperature detection element and equipped with a capacitor on its cathode side; and a high impedance detection circuit having its one input terminal connected to the anode of the first diode and to the power source and its other input terminal connected to the cathode of the second diode and to the capacitor so as to produce the output of the high impedance detection circuit and thus to detect the full charge of the battery. Accordingly, in comparison with the conventional systems, the device of the present invention provides such advantages that the full charge time can be detected accurately and excess charging and deficient charging can be prevented.

Hereinafter, an embodiment of the device of the present invention will be explained by referring to the accompanying drawings.

BRIEF DESCRIPTION OF THE DRAWINGS

In FIG. 1, reference numeral 1 is a power plug; 2 is a battery; 3 is a switching circuit; 4 is a temperature detection element, such as a thermistor, to be added to the battery 2; 5 is a full charge detection circuit and 9 is a rectification circuit. The battery 2 is connected to the power plug 1 via the switching circuit 3 and the rectification circuit 9, and the full charge detection circuit 5 turns on and off the switching circuit 3 by means of the change in the element 4 for detecting the temperature change in the battery 2. The full charge detection circuit 5 consists of a first diode 6, a second diode 8, a capacitor 7 and a high impedance detection circuit 10. The anode side of the first diode 6 is connected to the power source and its cathode side to the element 4. The anode side of the second diode 8 is connected to the cathode of the first diode 6 and to the element 4 while its cathode is grounded via the capacitor 7.

Figure 1:
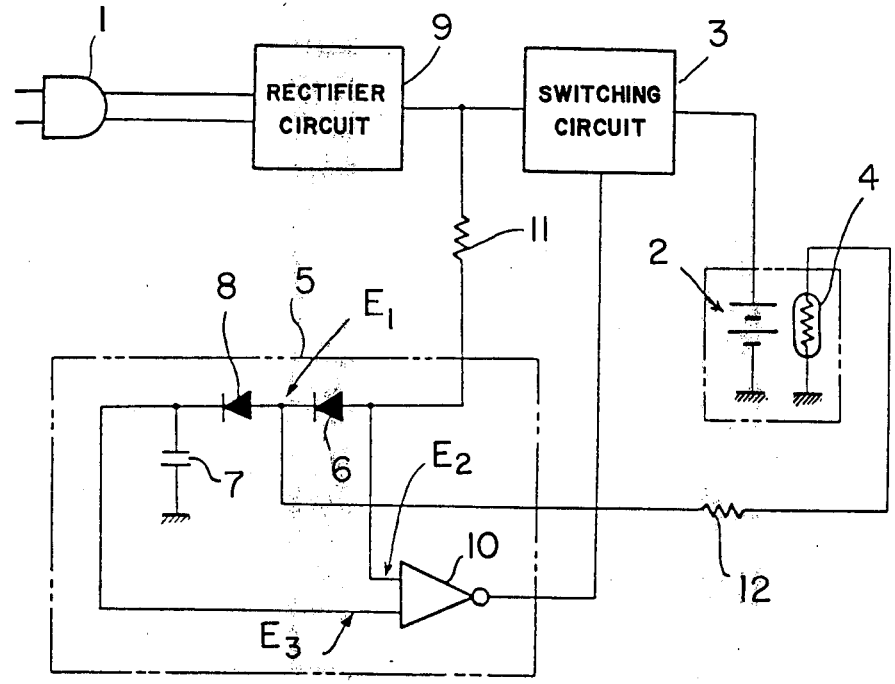
FIG. 1 is a circuit diagram of a preferred form of full charge detection circuit according to this invention.

On the other hand, the high impedance detection circuit 10 consists of a difference amplifier (e.g., FET) of a high impedance which is not affected by an integration circuit including the above-mentioned capacitor 7. One of its input terminals is connected to the anode of the first diode 6 and the other is connected to the cathode of the second diode 8, or, to the capacitor 7 with its output connected to the above-mentioned switching circuit 3.

Figure 2:
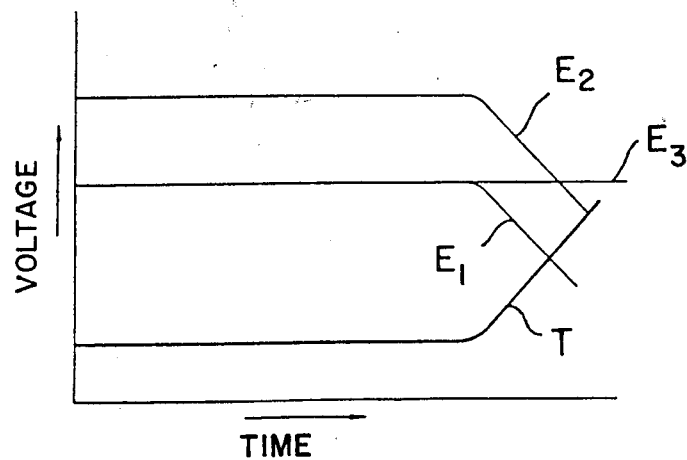
FIG. 2 is a diagram of certain voltage relationships.

When the plug 1 is inserted into the power source and the battery 2 starts being charged, the temperature T of the battery 2 does not change during charging whereby the cathode voltage $E_1$ of the first diode 6 connected to the element 4 is linear. This is illustrated in FIG. 2 in which the voltage is represented by the vertical and the horizontal scale indicates time. At this time, the voltage $E_1$ is stored in the capacitor 7 via the second diode 8. On the other hand, the voltage $E_2$ at the input terminal of the high impedance detection circuit is similarly linear. Thereafter, when the battery 2 is fully charged, the battery temperature T rises, thereby lowering the resistance of the thermistor 4 as the temperature detection element, for example, and hence, lowering the above-mentioned voltages $E_1$ and $E_2$. However, the initial voltage $E_1$ stored in the capacitor 7 is being applied as the same voltage $E_3$ to the high impedance detection circuit 10. Consequently, the high impedance detection circuit 10 detects the difference between the initial voltage $E_3$ and the lowered voltage $E_2$ and applies the difference to the switching circuit 3 so that the switching circuit 3 is turned off and cuts off the power circuit to the battery 2. In this manner, charging can be accurately completed at the time of full charge of the battery.

Incidentally, a resistor 11 is interposed between the first diode 6 and the rectification circuit 9 and determines the voltage value of $E_3$, the voltage values of $E_1$ and $E_2$ at the linear portions and their drop curves in conjunction with the internal resistance of the thermistor 4. Further, a resistor 12 is optionally interposed between the junction of the diodes 6 and 8 and the thermistor 4. This resistor 12 makes it possible to adjust further minutely the voltage value of $E_3$, those of $E_1$ and $E_2$ at the linear portions and their drop curves.

I claim:

1. In an automatic battery charging circuit connected to a source of direct current, comprising:
    switch means to connect and disconnect a battery to be charged to said direct current source;
    reference circuit means connected to said direct current source to provide first and second electrical reference values derived from said direct current source, comprising;

temperature responsive electrical impedance means in heat-exchanging relationship to said battery and being connected to said direct current source to provide a first electrical reference value which varies in response to changes in battery temperature;

electrical storage means connected to said direct current source in parallel with said temperature responsive means to establish a second electrical reference value when charging of a battery is initiated and to maintain said value during charging independently of a change in the first electrical reference value;

comparison circuit means including input means connected to sense each of said first and second electrical reference values and having output means connected to said switch means;

said switch means being responsive to a signal from the output means of said comparison circuit means to connect the battery to said source of direct current so long as both of said reference values remain substantially constant during charging, and to disconnect the battery in response to a variation in said first reference value upon completion of charging.

2. The circuit of claim 1, wherein said electrical reference values are voltages, said second value being maintained substantially constant by a capacitor which is isolated from discharge by connection in series with electrical one-way valve means.

3. The circuit of claim 2, wherein the first of said reference values is determined by resistor means in series with an input means of said comparison circuit means.

4. The circuit of claim 3, wherein said temperature responsive means comprises a thermistor isolated from an input means of said comparison circuit means by electrical one-way valve means.

5. The circuit of either claims 2 or 4, wherein said electrical one-way valve means comprise diode means.

6. The circuit of claim 5, wherein said diode means comprise a pair of serially connected diodes, and said reference circuit means includes first resistor means connected in series with said pair of serially connected diodes from one side of the direct current source to one input of the comparator circuit means to establish a first voltage as said second reference value, said first resistor being also connected in series with one of the diodes and the temperature responsive means to the other side of the direct current source.

7. The circuit of claim 6, wherein said comparator circuit means comprises a difference amplifier having at least two inputs and having an output connected to the switch means.

8. The circuit of claim 7, wherein a second resistor means is connected in the circuit with the first resistor means to establish said first electrical reference value.

9. The circuit of claim 8, wherein said second resistor means is connected between the temperature responsive means and the connection between the serially connected diodes.

10. The circuit of claim 9, wherein another input of the comparator circuit means is connected to said one side of the direct current source through said first resistor means.

* * * * *